US011157680B1

US 11,157,680 B1

(12) United States Patent
Lee et al.

(10) Patent No.: US 11,157,680 B1
(45) Date of Patent: Oct. 26, 2021

(54) SYSTEMS FOR SUGGESTING CONTENT COMPONENTS

(71) Applicant: Adobe Inc., San Jose, CA (US)

(72) Inventors: Tak Yeon Lee, Cupertino, CA (US); Sana Malik Lee, Brea, CA (US); Ryan A. Rossi, San Jose, CA (US); Qisheng Li, Seattle, WA (US); Fan Du, Milpitas, CA (US); Eunyee Koh, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/183,055

(22) Filed: Feb. 23, 2021

(51) Int. Cl.
G06F 40/14 (2020.01)
G06F 40/197 (2020.01)
G06F 40/186 (2020.01)
G06F 3/0482 (2013.01)

(52) U.S. Cl.
CPC ............ *G06F 40/14* (2020.01); *G06F 40/186* (2020.01); *G06F 40/197* (2020.01); *G06F 3/0482* (2013.01)

(58) Field of Classification Search
CPC ...... G06F 40/14; G06F 40/197; G06F 40/186; G06F 3/0482
See application file for complete search history.

(56) References Cited

U.S. PATENT DOCUMENTS 9,386,037 B1 * 7/2016 Hunt ...................... H04L 63/20
2010/0287134 A1 * 11/2010 Hauser ............. G06Q 10/06375
706/54

FOREIGN PATENT DOCUMENTS

WO    WO-2016137435 A1 *  9/2016  ......... G06F 16/2379

OTHER PUBLICATIONS

"Nikolay Ironov", Lebedev Studio Website [retrieved Jan. 8, 2021. Retrieved from the Internet <https://www.artlebedev.com/ironov/>., Jun. 26, 2020, 11 pages.
Kumar, Ranjitha et al., "Bricolage: Example-Based Retargeting for Web Design", CHI '11: Proceedings of the SIGCHI Conference on Human Factors in Computing Systems [retrieved Mar. 15, 2021]. Retrieved from the Internet <https://hci.stanford.edu/publications/2011/Bricolage/Bricolage-CHI2011.pdf>., May 2011, 10 pages.

* cited by examiner

*Primary Examiner* — Asher D Kells
(74) *Attorney, Agent, or Firm* — FIG. 1 Patents (57) ABSTRACT

In implementations of systems for suggesting content components, a computing device implements a design system to receive input data describing a feature of a content component to be included in a hypertext markup language (HTML) document. The design system represents that feature of the content component as a document object model (DOM) element and determines a hash value for the DOM element using locality-sensitive hashing. Manhattan distances are computed between the has value and has values described by a segment of content component data. The hash values were determined using the locality-sensitive hashing for DOM elements extracted from a corpus of HTML documents. The design system generates indications, for display in a user interface, of candidate content components for inclusion in the HTML document based on the Manhattan distances.

20 Claims, 11 Drawing Sheets

| Feature Group | Features |
|---|---|
| Tag info. | "tag_name": "td", "x": 557, "y": 1736, "width": 32, "height": 40, ... |
| Parent's CSS | color: "black", ... |
| Ancestors | "N_ancestors": 10, "four_direct_ancestors": ["td","tr","table","div"] |
| Children tags | "a", "div", "img" |
| Siblings | "same_tag_with_sibling": True |
| Dominant colors of surrounding pixels | "above": "(27, 14, 6)", "below": "(54, 45, 30)", "left": "(20, 124, 187)", "right": "(55, 52, 37)" |

420

Hashing Module 204

502
Receive input data describing a feature of a content component to be included in a hypertext markup language (HTML) document

504
Represent the feature of the content component as a document object model (DOM) element

506
Determine a hash value for the DOM element using locality-sensitive hashing

508
Compute Manhattan distances between the hash value and hash values described by a segment of content component data, the hash values determined using the locality-sensitive hashing for DOM elements extracted from a corpus of HTML documents

510
Generate, for display in a user interface, indications of candidate content components for inclusion in the HTML document based on the Manhattan distances

SYSTEMS FOR SUGGESTING CONTENT COMPONENTS

BACKGROUND

Systems that suggest content components for creating and/or editing digital content typically generate suggestions based on some defined measure of similarity or dissimilarity with respect to a group of candidate content components. Given an input or a query, these systems identify content components from the group that are similar or dissimilar to the input and suggest the identified content components for addition to the digital content. Conventional systems for suggesting dissimilar content components often generate suggestions which are so different from the input or the query that these suggestions are inconsistent with a design theme for the digital content and cannot be added to the digital content because of this inconsistency.

Conventional systems for suggesting similar content components frequently generate suggestions that are so similar to the input that these suggestions do not add any element of creativity or other improvement to the digital content. This shortcoming is somewhat mitigated by increasing a number and variety of candidate content components included in the group. However, these additional content components also correspond to an increase in computational resources consumed by the suggestion system to generate the suggestions such that conventional systems are unable to generate creative suggestions in substantially real time.

SUMMARY

Techniques and systems are described for suggesting content components. In an example, a computing device implements a design system to receive input data describing a feature of a content component to be included in a hypertext markup language (HTML) document. For example, the feature is a style feature, a content feature, a context feature, and so forth.

The design system represents the feature of the content component as a document object model (DOM) element and determines a hash value for the DOM element using locality-sensitive hashing based on p-stable distributions. The design system uses the hash value to identify a particular hash bucket from content component data that describes hash buckets and hash values included in the hash buckets. For example, the hash values are determined and grouped into the hash buckets using the locality-sensitive hashing based on p-stable distributions for DOM elements extracted from a corpus of HTML documents.

Manhattan distances are computed between the hash value and hash values included in the particular hash bucket. In one example, the Manhattan distances reflect a similarity between the DOM element and the DOM elements extracted from the corpus of HTML documents. The design system generates indications of candidate content components for display in a user interface based on the Manhattan distances. For example, the candidate content components are selectable for inclusion in the HTML document.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Systems for suggesting content components to include in digital content generate suggestions based on a defined measure of similarity with respect to a group of candidate content components. Given a query or an input, these systems identify content components from the group and suggest the identified content components for addition to the digital content. Conventional systems for suggesting similar content components generate suggestions that are so similar to the input that these suggestions often do not add any element of creativity or other improvement to the digital content. In order to overcome the limitations of conventional systems, techniques and systems are described for suggesting content components.

In one example, a computing device implements a design system to receive input data describing a feature of a content component to be included in a hypertext markup language (HTML) document. For example, the feature is a style feature, a content feature, a context feature, etc. In this example, the HTML document is an incomplete template and the content component is added to the HTML document to complete the template.

The design system represents the feature of the content component as a document object model (DOM) element and determines a hash value for the DOM element using locality-sensitive hashing based on p-stable distributions. For example, the locality-sensitive hashing determines hash values for inputs such that similar inputs are mapped to a same output segment or hash bucket with a high probability. This also facilitates approximate nearest neighbor searching which is performable in sublinear time.

The design system uses the hash value to identify a particular hash bucket from content component data that describes hash buckets and hash values included in the hash buckets. For example, the hash values are determined and grouped into the hash buckets using the locality-sensitive hashing based on p-stable distributions for DOM elements extracted from a corpus of HTML documents. Because the locality-sensitive hashing is applied in this manner, hash values included in individual ones of the hash buckets correspond to extracted DOM elements which are similar to each other. Accordingly, hash values included in the particular hash bucket correspond to extracted DOM elements that are similar to each other and are also similar to the DOM element.

The design system computes Manhattan distances between the hash value and the hash values included in the particular hash bucket. In one example, the Manhattan distances reflect a similarity between the DOM element and the DOM elements extracted from the corpus of HTML documents that correspond to the hash values included in the particular hash bucket. The design system generates indications of candidate content components for display in a user interface based on the Manhattan distances. For example, the candidate content components are selectable for inclusion in the HTML document. In this manner the template is completable using suggested content components that are similar to an input or query and also improve the HTML document such as by improving a visual appearance of the document.

By representing the content components extracted from the corpus of HTML documents as DOM elements to generate the content component data and by representing queries of the content component data as DOM elements, the described systems define similarity using a variety of style, content, and context features. This enables the described systems to suggest content components for creating and/or editing digital content that are similar to an input/query but which also improve the digital content which is not possible in conventional systems that generate suggestions which lack creativity. Additionally, by using the locality-sensitive hashing based on p-stable distributions to generate and query the content component data, the described systems are capable of generating content component suggestions in substantially real time from a group of candidate content components which is much larger than is possible in conventional systems. This is because the locality-sensitive hashing facilitates approximate nearest neighbor searching which is performable in sublinear time.

Term Examples

As used herein, the term "content component" refers to any element which is includable in a hypertext markup language (HTML) document. Examples of content components include digital images, text, banners, buttons, tables, graphics, icons, and so forth.

As used herein, the term "feature" of a content component refers to a characteristic of the content component. Examples of features of a content component include style, context, content, etc.

As used herein, the term "style" of a content component refers to a visual characteristic of the content component. By way of example, italic is a style of text.

As used herein, the term "context" of a content component refers to a characteristic surrounding the content component. By way of example, a background object is a context of text.

As used herein, the term "content" of a content component refers to a characteristic that is contained in or expressed by the content component. By way of example, a meaning of glyphs rendered as text is a content of the text.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

Figure 1:
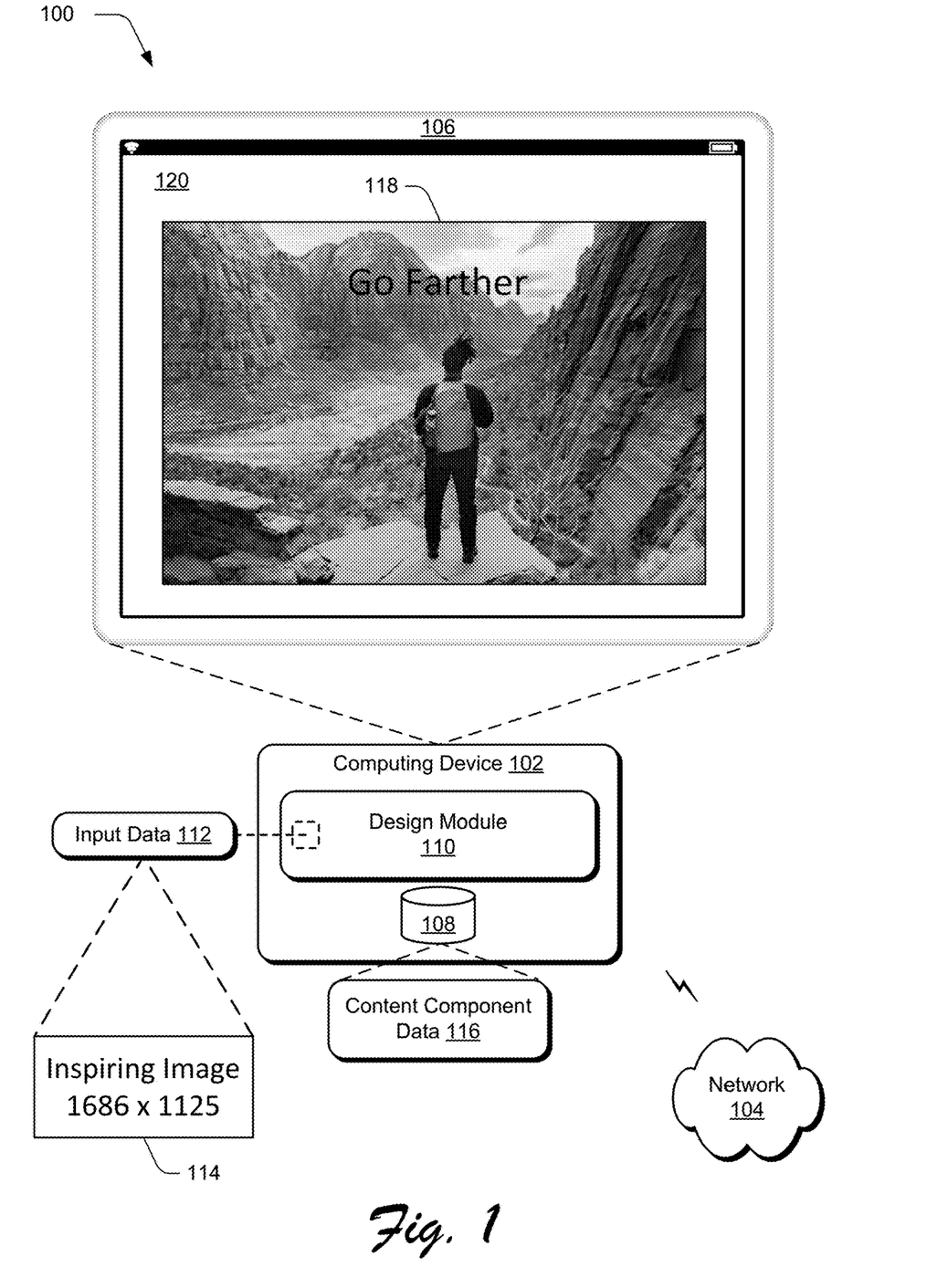
FIG. 1 is an illustration of an environment in an example implementation that is operable to employ digital systems and techniques for suggesting content components as described herein.

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. The computing device 102 includes a storage device 108 and design module 110. The design module 110 is illustrated as having, receiving, and/or transmitting input data 112.

The input data 112 describes input features 114. In the illustrated example, the input features 114 include "inspiring image" which is a content feature in one example. For example, the input features 114 also include "1686×1125" which is a size feature. In one example, the size is a style feature. In another example, the size is a context feature.

The design module 110 receives the input data 112 and processes the input data 112 as well as content component data 116 to suggest content components. For example, the content component data 116 describes hash values for document object model (DOM) elements which are extracted from a corpus of hypertext markup language (HTML) documents. In one example, the design module 110 receives and/or accesses the content component data 116. In another example, the design module 110 generates the content component data 116.

For example, the content component data 116 is generated by extracting HTML elements from the corpus of HTML documents and representing the extracted HTML elements as DOM elements. Each of the DOM elements includes content features, context features, and/or style features. In this example, the hash values for the DOM elements are determined, e.g., using locality-sensitive hashing based on p-stable distributions. As a result, DOM element representations of the extracted HTML elements are grouped into hash buckets such that similar DOM element representations are grouped into a same hash bucket.

Because the content component data 116 is generated in this manner, hash values included in a hash bucket described by the content component data 116 correspond to DOM element representations having similar content features, context features, and/or style features. Once identified, these DOM element representations are usable to suggest corresponding extracted HTML elements as candidate content components. In order to suggest content components in one example, the design module 110 represents the input data 112 as a DOM element having the input features 114 and uses the locality-sensitive hashing based on p-stable distributions to compute a hash value for the DOM element.

For example, the hash value for the DOM element corresponds to a particular hash bucket described by the content component data 116. Hash values included in the particular hash bucket correspond to DOM elements having content features, context features, and/or style features which are similar to the input features 114. The design module 110 computes Manhattan distances between the hash value for the DOM element and the hash values included in the particular hash bucket.

The design module 110 suggests a candidate content component 118 based on the Manhattan distances and this candidate content component 118 is displayed in a user interface 120 of the display device 106. In one example, the candidate content component 118 is an extracted HTML element from the corpus of HTML documents which corresponds to a hash value having a shortest Manhattan distance from the hash value for the DOM element in the particular hash bucket. As shown in FIG. 1, the candidate content component 118 includes features which are similar to the input features 114 described by the input data 112.

For example, the candidate content component 118 has a size equal to 1686×1125 which is identical to the size feature of the input features 114. The candidate content component 118 is also an image depicting a person viewing a rugged landscape with a caption "Go Farther" which inspires a viewer of the image, e.g., to overcome adversity. Although illustrated as a single candidate content component 118, it is to be appreciated that the design module 110 displays a list of candidate content components in some examples which are sorted based on the Manhattan distances. The list is sorted in ascending order of the Manhattan distances in an example in which the design module 110 arranges the candidate content components from most similar to the input features 114 to least similar to the input features 114. The list is sorted in descending order of the Manhattan distances in another example in which the design module 110 arranges the candidate content components from least similar to the input features 114 to most similar to the input features 114.

Figure 2:
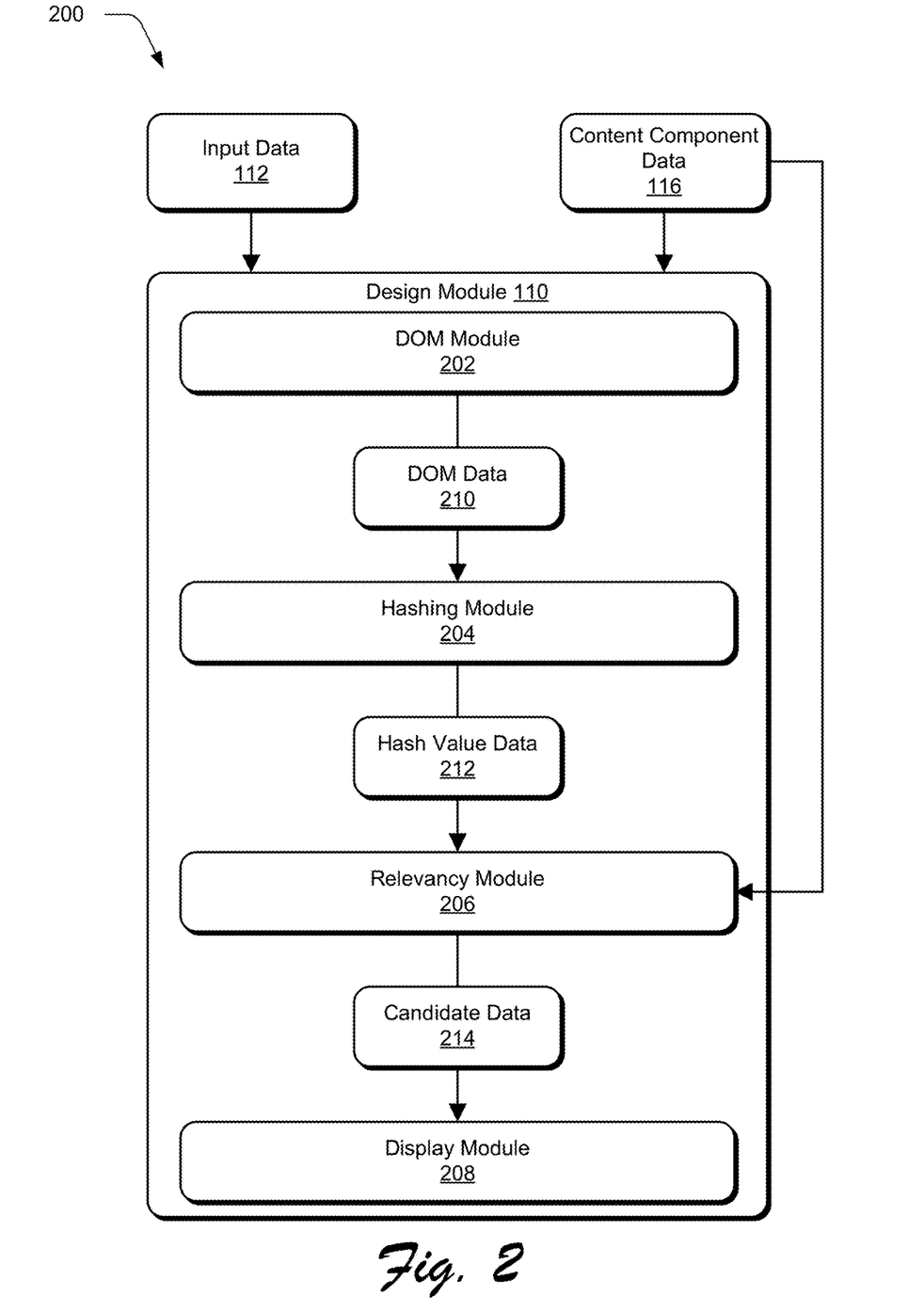
FIG. 2 depicts a system in an example implementation showing operation of a design module for suggesting content components.

FIG. 2 depicts a system 200 in an example implementation showing operation of a design module 110. The design module 110 is illustrated to include a document object model (DOM) module 202, a hashing module 204, a relevancy module 206, and a display module 208. The design module 110 is illustrated as receiving the input data 112 and the content component data 116. In some examples, the design module 110 generates the content component data 116.

Figure 3:
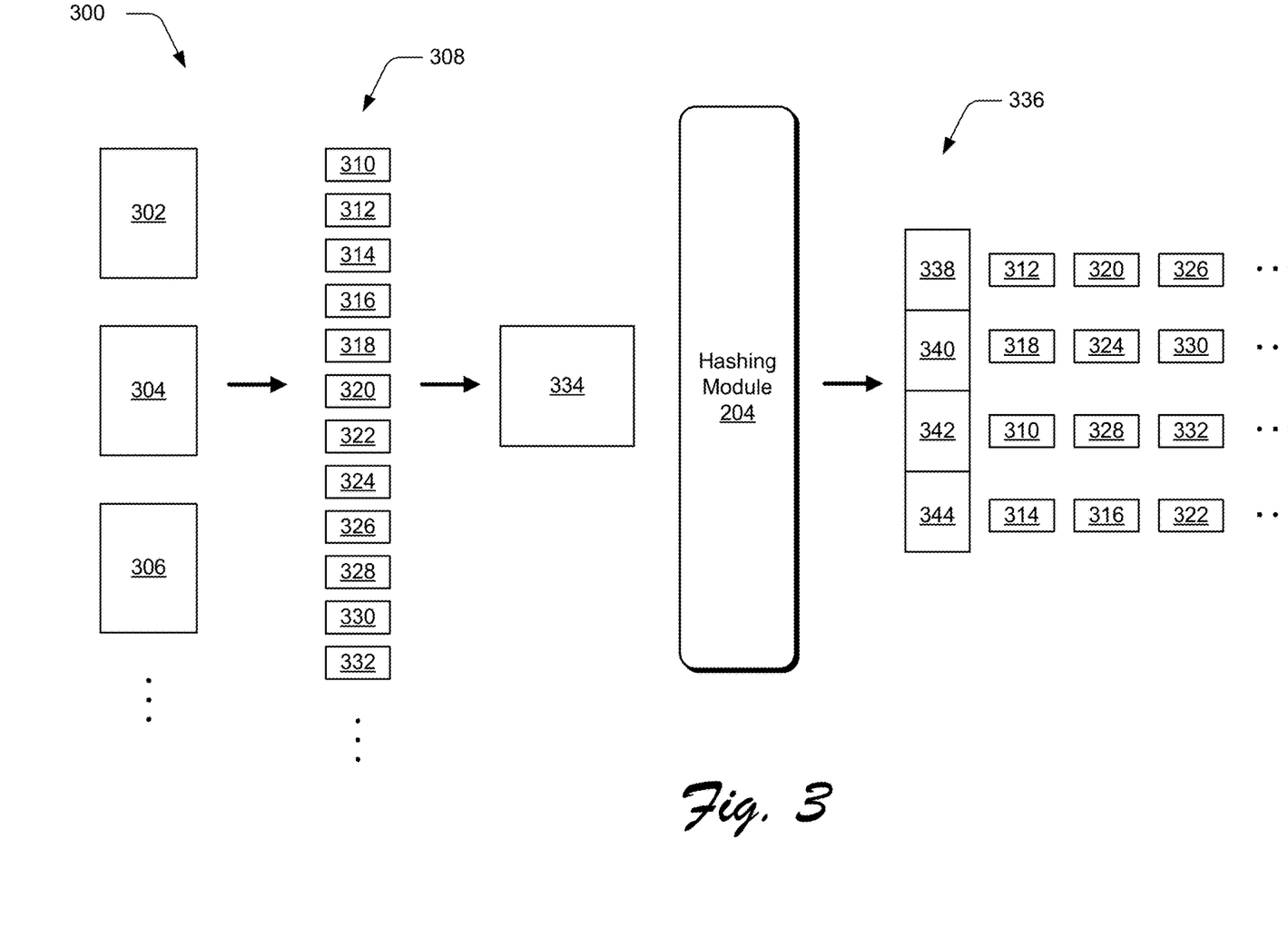
FIG. 3 illustrates an example representation of generating content component data.

FIG. 3 illustrates an example representation 300 of generating content component data 116. The representation 300 includes hypertext markup language (HTML) documents 302-306 which include content components and the design module 110 extracts the content components from the HTML documents 302-306. The design module 110 represents these extracted content components as a set 308 of document object model (DOM) elements. As shown, the set 308 includes DOM elements 310-332. Each of the DOM elements 310-332 includes content features, context features, and/or style features.

For example, each of the DOM elements 310-332 includes features extracted from the HTML documents 302-306 such as tags (e.g., BUTTON, TD, TR, DIV, SPAN, and so forth), coordinates, e.g., top, left, right, bottom, and center coordinates. In one example, the center coordinates also include a percentile with respect to a corresponding one of the HTML documents 302-306. In another example, the features of the DOM elements 310-332 include hierarchy information such as a number of ancestors, lists of direct ancestors, types of child tags, a number of descendants, siblings of a same tag, and so forth. In some examples, the features of the DOM elements 310-332 include information such as style attributes of a parent, foreground color values, background color values, indications whether a background is an image or not an image, font family information (e.g., size, weight, alignment, decoration, shadow, etc.), border width, margins and padding, dominant colors of surrounding pixels, etc.

For example, DOM elements 310-316 correspond to content components extracted from HTML document 302, DOM elements 318-324 correspond to content components extracted from HTML document 304, and DOM elements 326-332 correspond to content components extracted from HTML document 306. For each of the DOM elements 310-332, the design module 110 extracts its content features, context features, and/or style features and compiles these features into a matrix 334.

In one example, the matrix 334 includes an identifier for each of the DOM elements 310-332 and the extracted content features, context features, and/or style features of a corresponding one of the DOM elements 310-332. Based on the matrix 334, the hashing module 204 computes hash values for the DOM elements 310-332 and uses the hash values to assign the DOM elements 310-332 to a set 336 of hash buckets 338-344. For example, the hashing module 204 computes the hash values using locality-sensitive hashing based on p-stable distributions. By computing the hash values in this manner, the hashing module 204 maps (with a high probability) similar DOM elements 310-332 to a same one of the hash buckets 338-344.

For example, DOM elements 312, 320, and 326 are included in hash bucket 338 which indicates that the DOM elements 312, 320, and 326 are similar to each other even though DOM element 312 was extracted from the HTML document 302, DOM element 320 was extracted from the HTML document 304, and DOM element 326 was extracted from the HTML document 306. Similarly, DOM elements 318, 324, and 330 are included in hash bucket 340; DOM elements 310, 328, and 332 are included in hash bucket 342; and DOM elements 314, 316, and 322 are included in hash bucket 344. Accordingly, DOM elements 318, 324, and 326 are similar to each other; DOM elements 310, 328, and 332 are similar to each other; and DOM elements 314, 316, and 322 are similar to each other. The design module 110 generates the content component data 116 as describing the hash values and corresponding hash buckets 338-344 for the DOM elements 310-332.

Figure 4A:
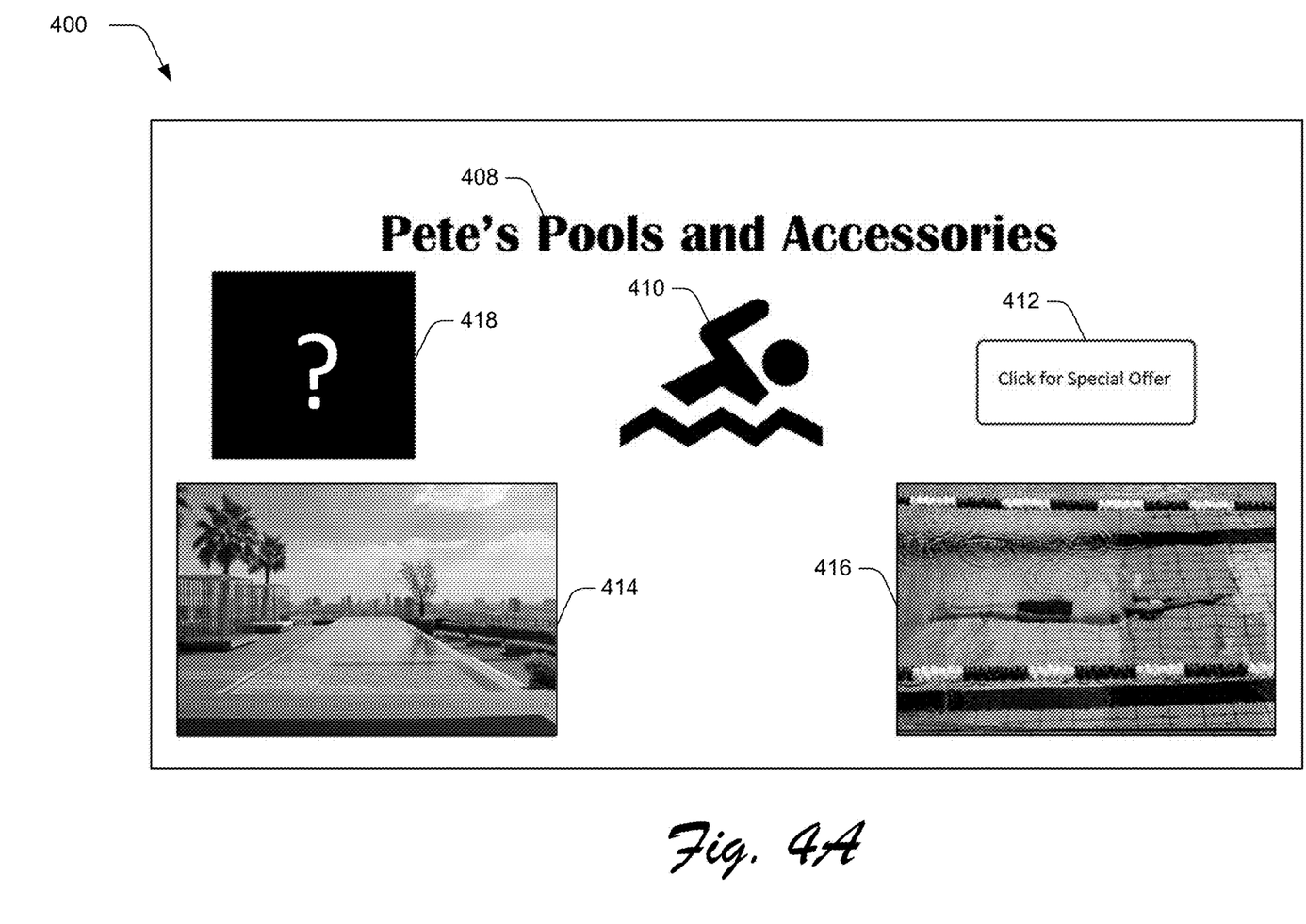
FIGS. 4A, 4B, 4C, and 4D illustrate an example of suggesting content components.
Figure 4B:
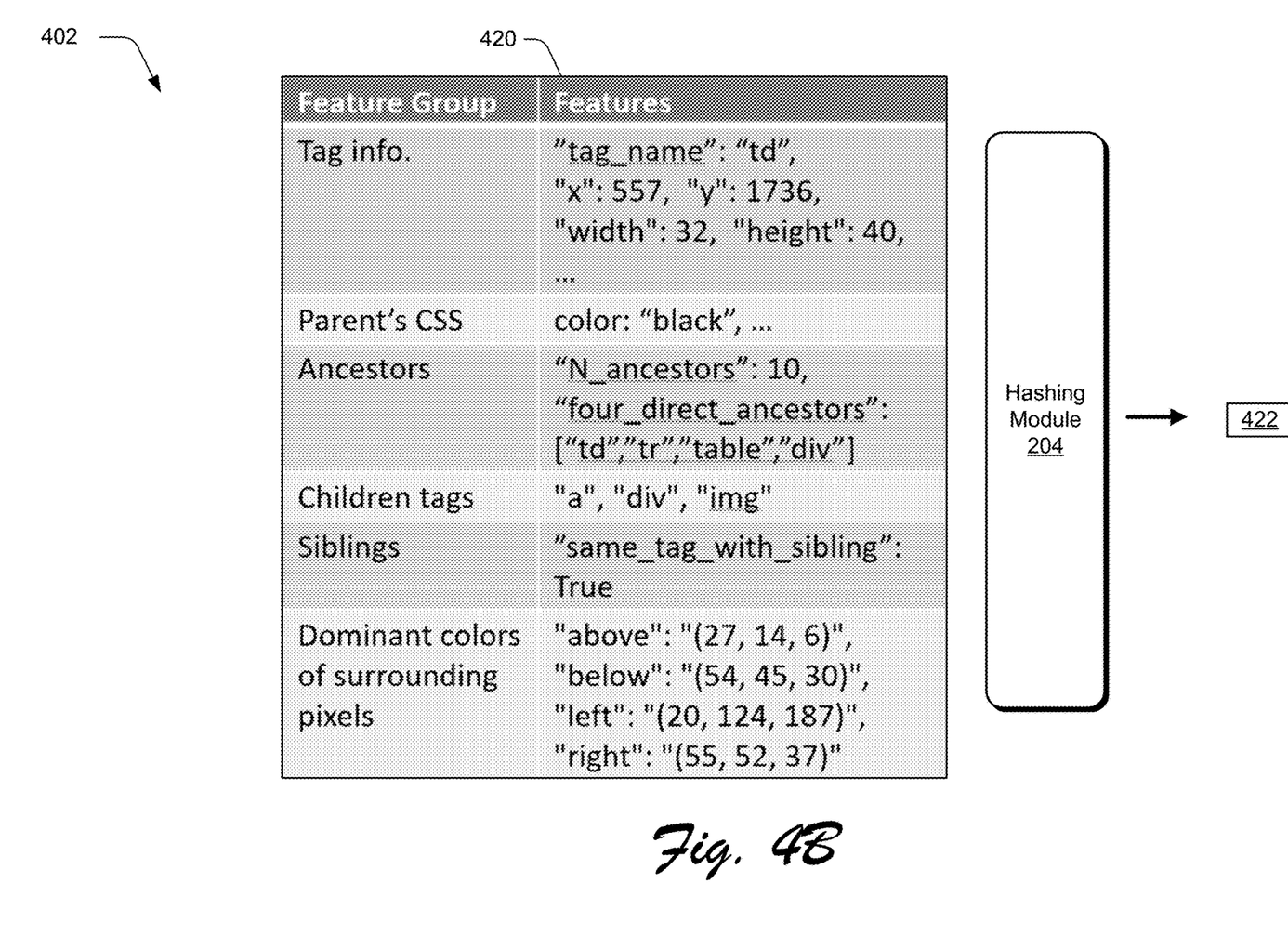
Figure 4C:
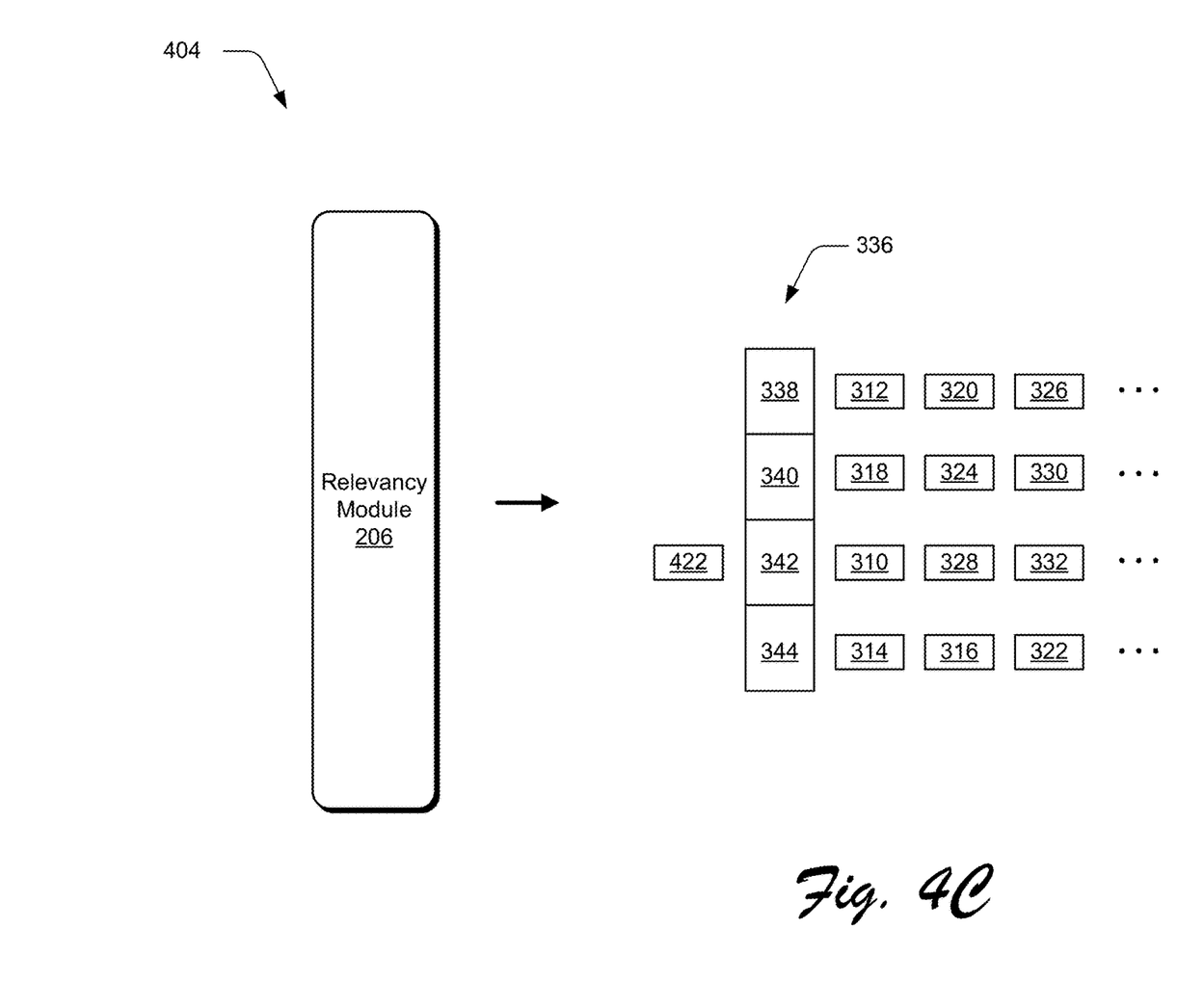
Figure 4D:
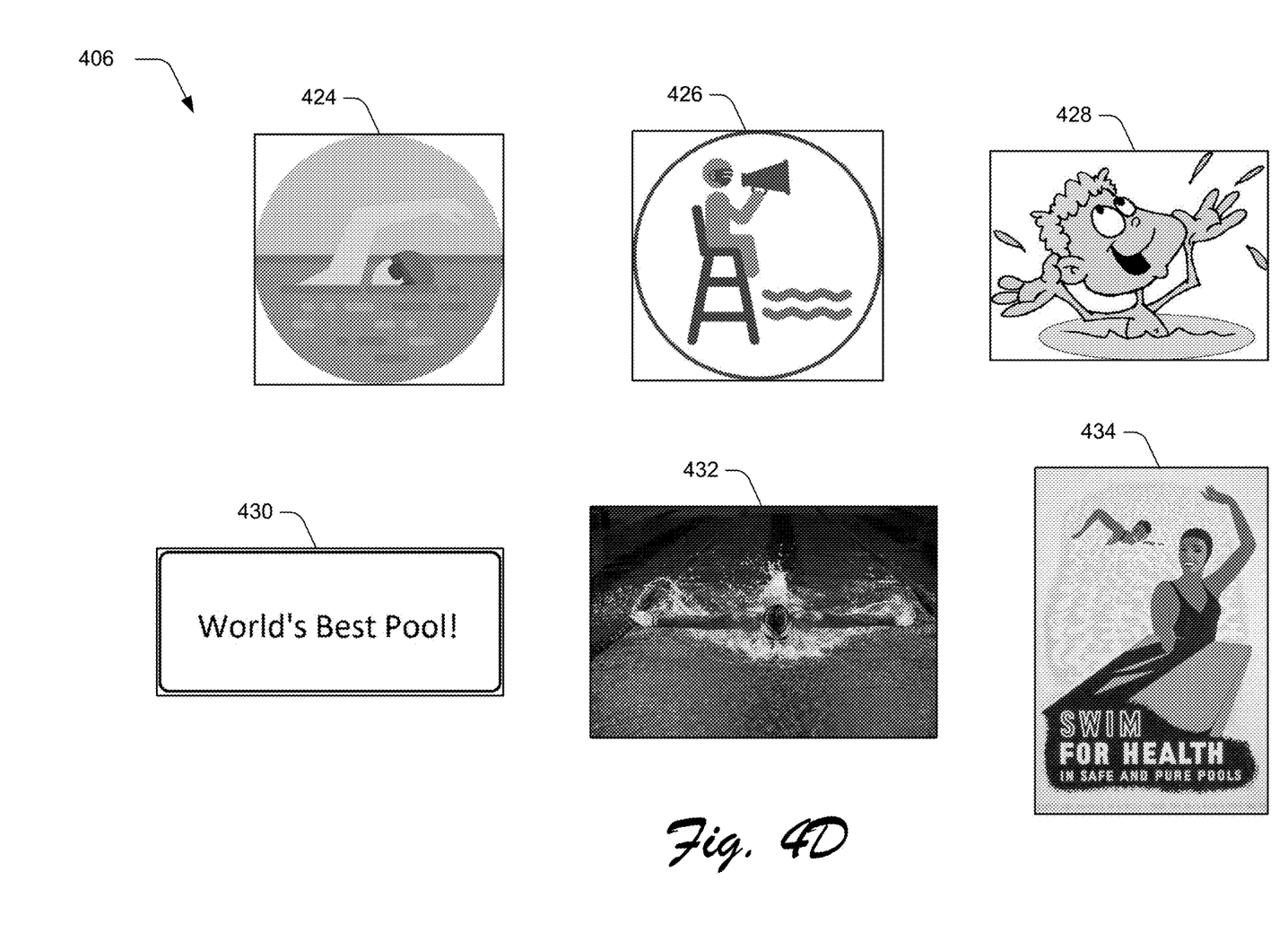

FIGS. 4A, 4B, 4C, and 4D illustrate an example of suggesting content components. FIG. 4A illustrates a representation 400 of a hypertext markup language (HTML) document. FIG. 4B illustrates a representation 402 of input features 114 described by the input data 112. FIG. 4C illustrates a representation 404 of identifying a hash bucket based on the input data 112. FIG. 4D. illustrates a representation 406 of identified candidate content components based on the identified hash bucket.

As shown in FIG. 4A, the HTML document is an e-mail template and includes content components 408-416. For example, content component 408 is text which includes content of "Pete's Pools and Accessories." Content component 410 is an icon depicting a person swimming and content component 412 is a button that indicates "Click for Special Offer." Content components 414 and 416 are digital images. For example, the content component 414 depicts a swimming pool and the content component 416 depicts a person swimming in a swimming pool.

The HTML document also includes an incomplete portion 418 and this incomplete portion 418 is usable to query the content component data 116 to identify content components which are usable to complete the incomplete portion 418. The design module 110 receives this query as input data 112. In one example, a user interacts with an input device and specifies at least one feature of a content component to generate the input data 112 and query the content component data 116. In another example, the input data 112 is generated automatically, e.g., based on features of the content components 408-416 included in the HTML document.

With reference to FIG. 2, the DOM module 202 receives the input data 112 that describes features of a content component and the DOM module 202 processes the input data 112 to represent the input data 112 as a DOM element having the features of the content component. For example, the DOM module 202 generates DOM data 210 describing the DOM element representation having the features of the content component. As shown, the hashing module 204 receives the DOM data 210 and processes the DOM data to generate hash value data 212.

The representation 402 illustrated in FIG. 4B includes an example 420 of the DOM data 210. The example 420 includes feature groups and corresponding features such as tag information, parent's CSS, ancestors, children tags, siblings, dominant colors of surrounding pixels, and so forth. The hashing module 204 receives the DOM data 210 and computes a hash value 422 for the DOM element representation described by the DOM data 210 using the locality-sensitive hashing based on p-stable distributions. For example, the hashing module 204 computes the hash value 422 using the same locality-sensitive hashing based on p-stable distributions that was used to generate the content component data 116. The hashing module 204 generates the hash value data 212 as describing the hash value 422.

The relevancy module 206 receives the hash value data 212 and the content component data 116 and processes the hash value data 212 and/or the content component data 116 to generate candidate data 214. As illustrated in FIG. 4C, the relevancy module 206 maps the hash value 422 to a particular one of the hash buckets 338-344 described by the content component data 116. In order to identify the particular hash bucket, the relevancy module 206 performs an approximated nearest neighbor search of the content component data 116 using the hash value 422 as a query. In this example, the hash value 422 is included in the hash bucket 342 which also includes the DOM elements 310, 328, 332, etc. The relevancy module 206 computes Manhattan distances between the hash value 422 and hash values corresponding to each of the DOM elements included in the hash bucket 342. For example, the relevancy module 206 generates candidate data 214 as describing the Manhattan distances and corresponding DOM elements.

The display module 208 receives the candidate data 214 and processes the candidate data 214 to generate indications of candidate content components 424-434 which are illustrated in FIG. 4D. For example, the display module 208 displays the candidate content components 424-434 based on the Manhattan distances in an ascending order. In this example, candidate content component 424 corresponds to a DOM element included in the hash bucket 342 which has a shortest Manhattan distance from the hash value 422. Similarly, candidate content component 434 corresponds to a DOM element included in the hash bucket 342 which has a longest Manhattan distance from the hash value 422.

Accordingly, candidate content component 426 is associated with a greater Manhattan distance than the candidate content component 424. Candidate content component 428 is associated with a greater Manhattan distance than the candidate content component 426. Candidate content component 430 is associated with a greater Manhattan distance than the candidate content component 428, and candidate content component 432 is associated with a greater Manhattan distance than the candidate content component 430.

Any of the candidate content components 424-434 are usable to complete the incomplete portion 418 of the HTML document. For example, the candidate content component 424 is a graphic depicting a person swimming. The candidate content component 426 is an icon depicting a lifeguard and the candidate content component 428 is a graphic depicting a character in a body of water. As shown, the candidate content component 430 is a button indicating "World's Best Pool!" and the candidate content component 432 is a digital image depicting a person swimming in a pool. Finally, the candidate content component 434 is graphic art advocating that one should "swim for health in safe and pure pools."

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

Figure 5:
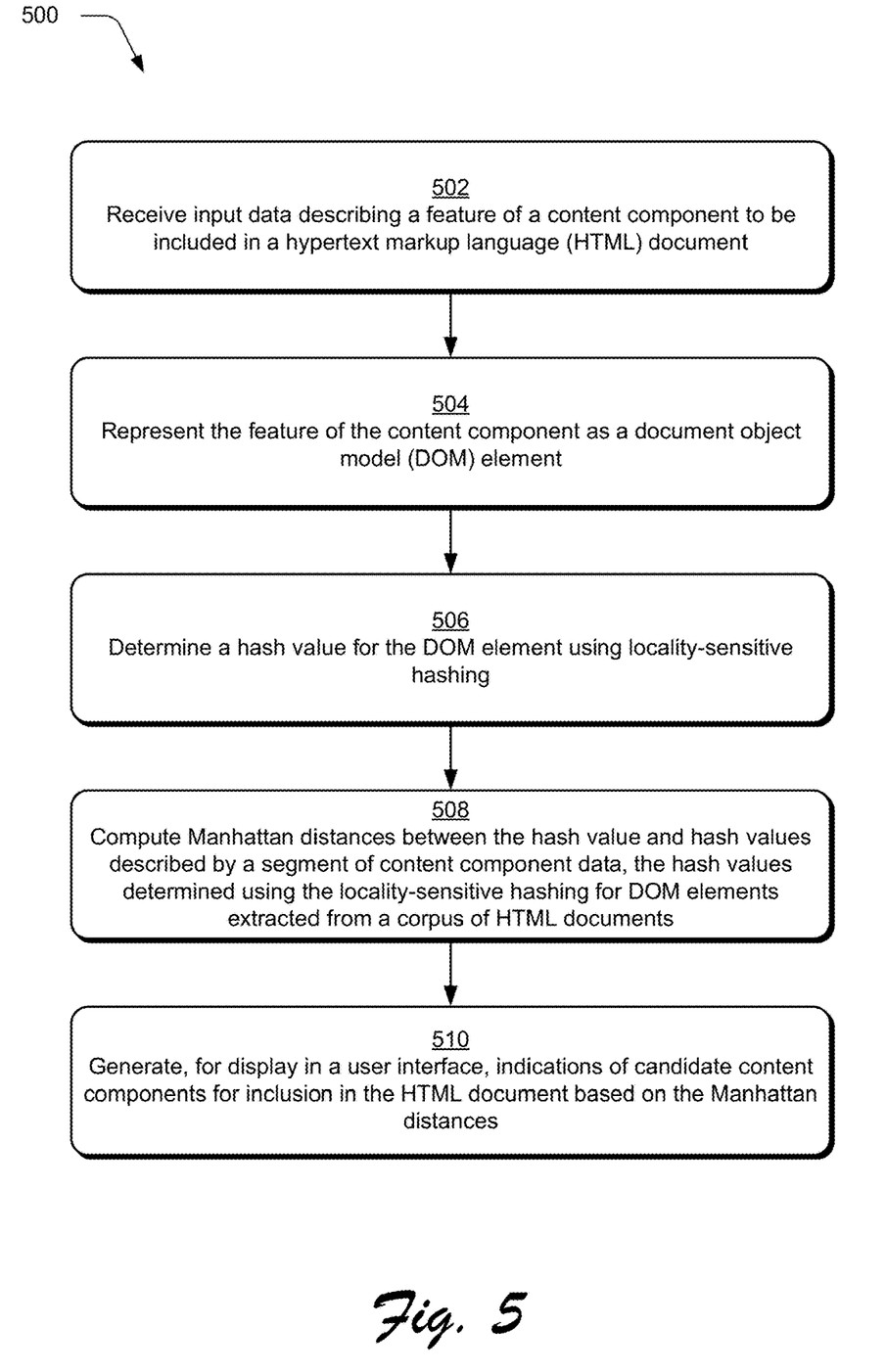
FIG. 5 is a flow diagram depicting a procedure in an example implementation in which input data describing a feature of a content component to be included in a hypertext markup language (HTML) document is received and indications of candidate content components are generated for inclusion in the HTML document.

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-4. FIG. 5 is a flow diagram depicting a procedure 500 in an example implementation in which input data describing a feature of a content component to be included in a hypertext markup language (HTML) document is received and indications of candidate content components are generated for inclusion in the HTML document.

Input data describing a feature of a content component to be included in an HTML document is received (block 502). The computing device 102 implements the design module 110 to receive the input data in one example. The feature of the content component is represented as a document object model (DOM) element (block 504). For example, the design module 110 represents the feature of the content component as the DOM element. A hash value for the DOM element is determined using locality-sensitive hashing (block 506). The design module 110 determines the hash value using the locality-sensitive hashing in one example.

Manhattan distances are computed (block 508) between the hash value and hash values described by a segment of content component data, the hash values determined using the locality-sensitive hashing for DOM elements extracted from a corpus of HTML documents. The computing device 102 implements the design module 110 to compute the Manhattan distances in an example. Indications of candidate content components are generated for inclusion in the HTML document based on the Manhattan distances (block 510), the indications are generated for display in a user interface. For example, the design module 110 generates the indications of the candidate content components for display in the user interface.

Figure 6:
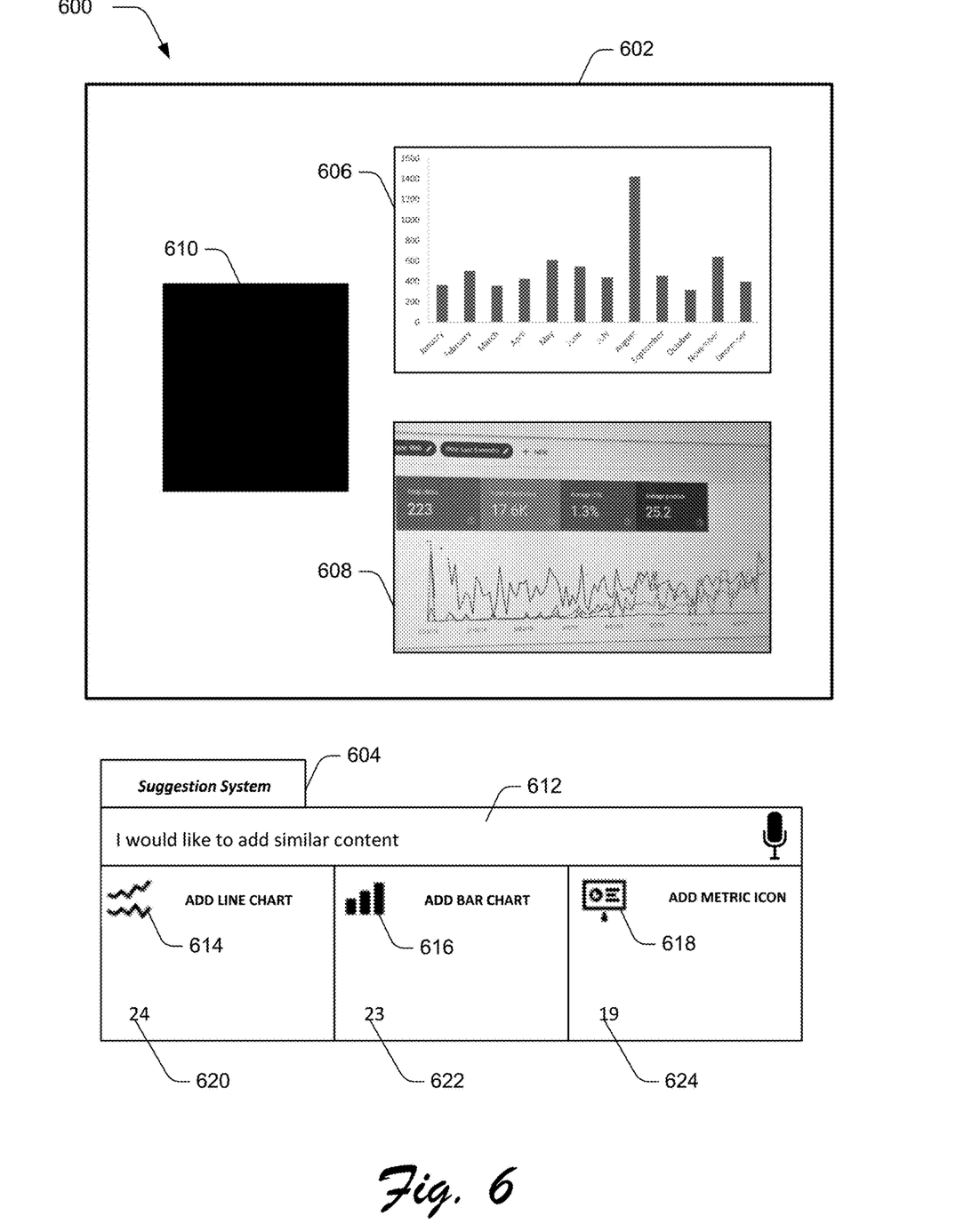
FIG. 6 illustrates an example representation of a user interface for suggesting content components.

FIG. 6 illustrates an example representation 600 of a user interface for suggesting content components. As shown, the representation 600 includes a hypertext markup language (HTML) document 602 and a user interface element 604. The HTML document 602 is template such as an e-mail template in this example and includes a first content component 606, a second content component 608, and a content component input field 610. In one example, the HTML document 602 is an incomplete version of a template and the corpus of HTML documents used to generate the content component data 116 includes completed versions of the template. As shown, the first content component 606 is a bar graph which includes values for every month of a calendar year and the second content component 608 is a digital image depicting results of an example analytics query.

The content component input field 610 is an incomplete portion of the HTML document 602 and a user interacts with an input device to provide a user input which the design module 110 receives as the input data 112. Responsive to receiving the input data 112, the design module 110 displays indications of candidate content components which are selectable for inclusion in the content component input field 610 to complete the incomplete portion of the HTML document 602. For example, the input device is a mouse, keyboard, microphone, stylus, and so forth. In the illustrated example, the input device is a microphone or a keyboard and the user interacts with the input device to indicate "I would like to add similar content" which is displayed in a user input field 612 of the user interface element 604.

The design module 110 receives the indicated user input as the input data 112 and extracts the first content component 606 and the second content component 608 from the HTML document 602. For example, the design module 110 represents the first content component 606 and the second content component 608 as document object model (DOM) elements having style features, context features, and/or content features. The design module 110 determines a hash value for the DOM elements using locality-sensitive hashing based on p-stable distributions.

In one example, the design module 110 accesses the content component data 116 which was generated using the locality-sensitive hashing based on p-stable distributions and identifies a hash bucket described by the content component data 116 that corresponds to the hash value. The hash bucket includes additional hash values which were determined for DOM element representations of content components extracted from a corpus of HTML documents using the locality-sensitive hashing based on p-stable distributions. The design module 110 computes Manhattan distances between the hash value and the additional hash values and generates indications of candidate content components 614-618 based on the Manhattan distances.

For example, candidate content component 614 is associated with an additional hash value included in the hash bucket that has a shortest Manhattan distance from the hash value. As shown, the candidate content component 614 is displayed in a as a suggestion to add a line chart in a field of the user interface element 604. In some examples, the design module 110 adds the candidate content component 614 to the HTML document 602 automatically and without user intervention.

Candidate content component 616 is associated with an additional hash valued included in the hash bucket which has a second shortest Manhattan distance from the hash value. The candidate content component 616 is displayed as a suggestion to add a bar chart in the field of the user interface element 604. In an example in which the HTML document 602 in an incomplete version of a template, the design module 110 generates a complete version of the template by adding the candidate content component 614 to the HTML document 602 and the design module 110 generates an additional completed version of the template by adding the candidate content component 616 to the HTML document 602. For example, the design module 110 generates the additional completed version of the template automatically and without user intervention.

In an example, candidate content component 618 is associated with an additional hash value included in the hash bucket that has a third shortest Manhattan distance from the hash value. As illustrated, the candidate content component 618 is displayed as a suggestion to add a metric icon in the field of the user interface element 604. In one example, the user interacts with the input device and selects one of the candidate content components 614-618 for inclusion in the HTML document 602. In this example, the design module 110 automatically adds the selected candidate content component to the HTML document 602 by rendering the selected candidate content component in the content component input field 610 which completes the incomplete portion of the HTML document 602.

In the illustrated example, the design module 110 also computes and displays consistency scores 620-624 for each of the candidate content components 614-618. The consistency scores 620-624 represent a number of style features, context features, and/or content features that are included in DOM element representations of each of the candidate content components 614-618 and which are also included in the DOM element representation of the first content component 606 and the second content component 608. In one example, the consistency scores 620-624 are not weighted meaning that no particular feature is considered more important than any other feature. In this example, the design module 110 represents the style features, context features, and/or content features that are included in DOM element representations as vectors using one-hot encoding and computes the consistency scores 620-624 as dot products of the vectors. In another example, the consistency scores 620-624 are weighted. In this example, a particular feature such as a size feature is assigned a greater weight than another feature such as a siblings feature.

As shown, the candidate content component 614 has a consistency score 620 equal to 24, the candidate content component 616 has a consistency score 622 equal to 23, and the candidate component 618 has a consistency score 624 equal to 19. In an example in which the user desires to complete the HTML document 602 using a candidate content component having a highest similarity to the first and second content components 606, 608, then the user selects the candidate content component 614 to include in the content component input field 610. In an example in which the user desires to complete the HTML document 602 using a candidate content component having a lowest similarity to the first and second content components 606, 608, then the user selects the content component 618 to include in the content component input field 610. Accordingly, the consistency scores 620-624 are leverageable to increase or decrease an amount of variation between content components included in the HTML document 602.

In another example, instead of selecting one of the candidate content components 614-618 for inclusion in the content component input field 610, the user desires to map a style of one of the content components 614-618 to a different content component which the user has included in the content component input field 610. In this example, the user interacts with the input device and selects the content component 618 to transfer a style of the content component 618 to the different content component. To do so, the design module 110 represents the content component 618 and the different content component as trees with nodes corresponding to the features included in the DOM element representation of the content component 618 and included in a DOM element representation of the different content component. The nodes of the trees are connected by edges which reflect a cost or a difference between two nodes connected by each edge. The design module 110 determines an optimized set of edges which minimizes the corresponding costs or differences and transfers style features from the content component 618 to the different content component along the optimized set of edges.

Figure 7:
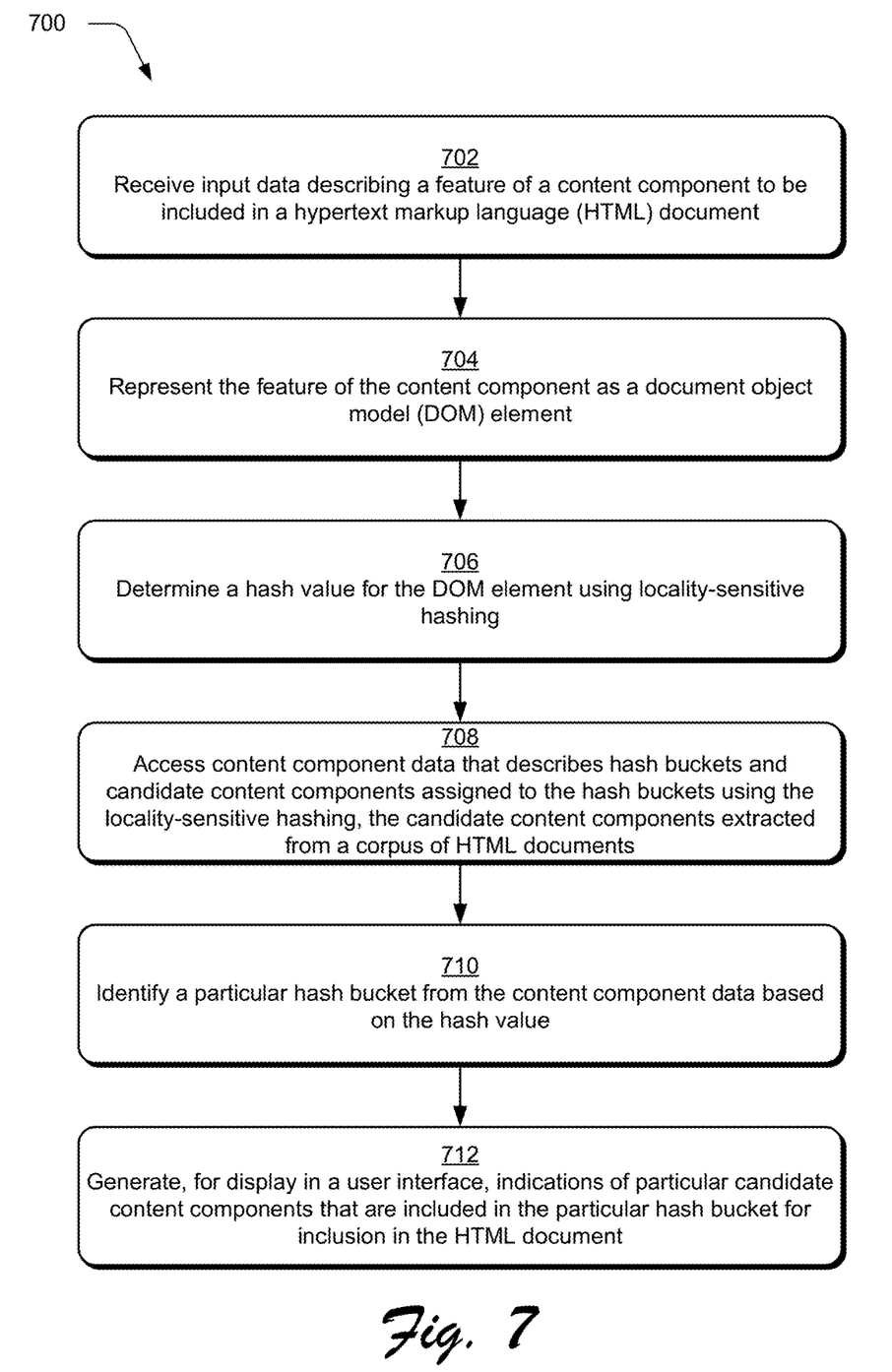
FIG. 7 is a flow diagram depicting a procedure in an example implementation in which input data describing a feature of a content component to be included in a hypertext markup language (HTML) document is received and indications of particular candidate content components are generated for inclusion in the HTML document.

FIG. 7 is a flow diagram depicting a procedure 700 in an example implementation in which input data describing a feature of a content component to be included in a hypertext markup language (HTML) document is received and indications of particular candidate content components are generated for inclusion in the HTML document. Input data describing a feature of a content component to be included in an HTML document is received (block 702). For example, the computing device 102 implements the design module 110 to receive the input data. The feature of the content component is represented as a document object model (DOM) element (block 704). In one example, the design module 110 represents the feature of the content component as the DOM element. A hash value for the DOM element is determined using locality-sensitive hashing (block 706). The design module 110 determines the hash value using the locality-sensitive hashing in one example.

Content component data is accessed (block 708) that describes hash buckets and candidate content components assigned to the hash buckets using the locality-sensitive hashing, the candidate content components extracted from a corpus of HTML documents. In an example, the computing device 102 implements the design module 110 to access the content component data. A particular hash bucket is identified (block 710) from the content component data based on the hash value. The design module 110 identifies the particular hash bucket from the content component data in one example. Indications of particular candidate content components that are included in the particular hash bucket are generated for inclusion in the HTML document (block 712), the indications are generated for display in a user interface. For example, the design module 110 generates the indications of the particular candidate content components.

Example System and Device

Figure 8:
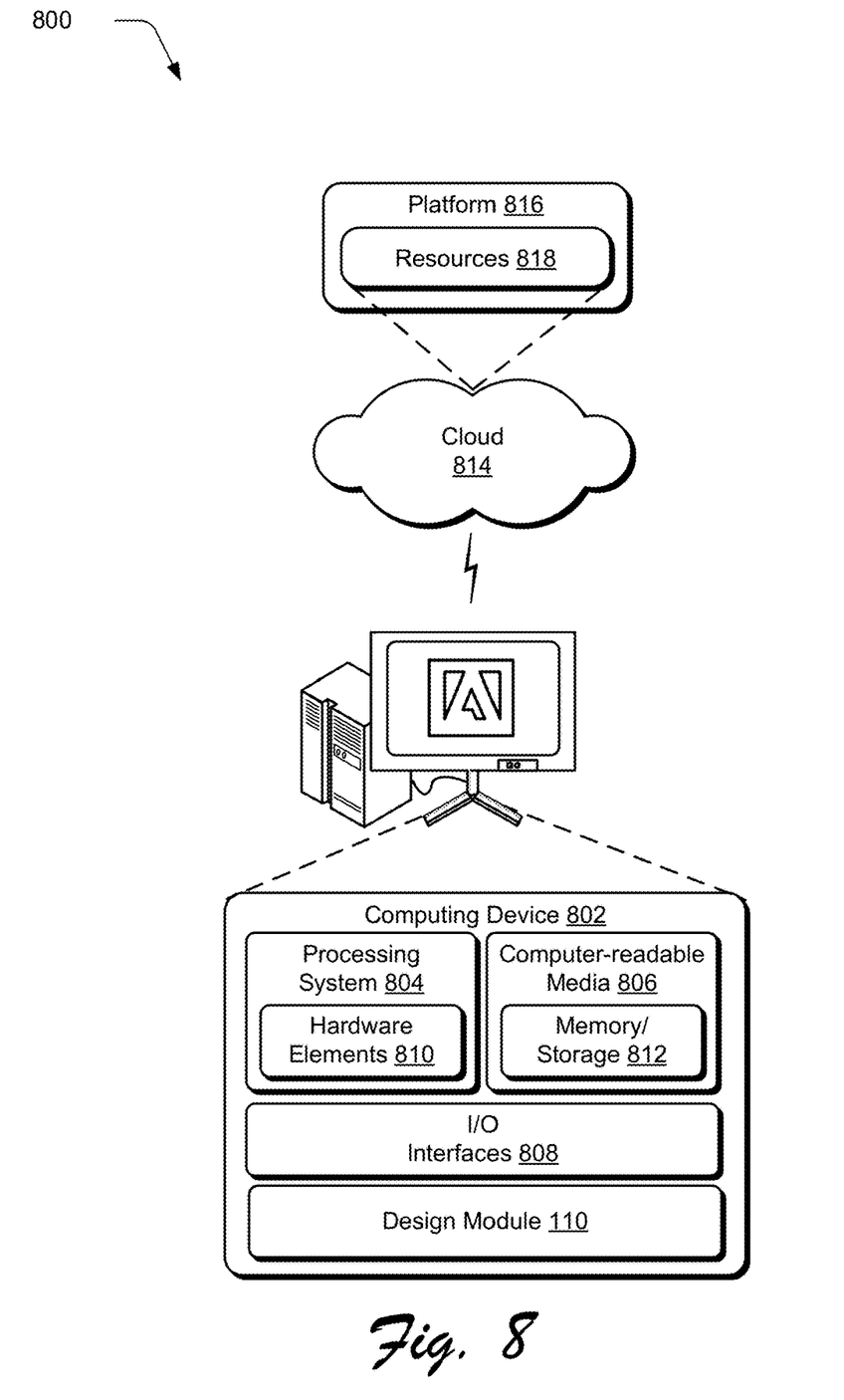
FIG. 8 illustrates an example system that includes an example computing device that is representative of one or more computing systems and/or devices for implementing the various techniques described herein.

FIG. 8 illustrates an example system 800 that includes an example computing device that is representative of one or more computing systems and/or devices that are usable to implement the various techniques described herein. This is illustrated through inclusion of the design module 110. The computing device 802 includes, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that are configured as processors, functional blocks, and so forth. This includes example implementations in hardware as an application specific integrated circuit or other logic device formed using one or more semiconductors. The hardware elements 810 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 806 is illustrated as including memory/storage 812. The memory/storage 812 represents memory/storage capacity associated with one or more computer-readable media. In one example, the memory/storage 812 includes volatile media (such as random access memory (RAM)) and/or nonvolatile media (such as read only memory (ROM), Flash memory, optical disks, magnetic disks, and so forth). In another example, the memory/storage 812 includes fixed media (e.g., RAM, ROM, a fixed hard drive, and so on) as well as removable media (e.g., Flash memory, a removable hard drive, an optical disc, and so forth). The computer-readable media 806 is configurable in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 802. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 802, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 810. For example, the computing device 802 is configured to implement particular instructions and/or functions corresponding to the software and/or hardware modules. Accordingly, implementation of a module that is executable by the computing device 802 as software is achieved at least partially in hardware, e.g., through use of computer-readable storage media and/or hardware elements 810 of the processing system 804. The instructions and/or functions are executable/operable by one or more articles of manufacture (for example, one or more computing devices 802 and/or processing systems 804) to implement techniques, modules, and examples described herein.

The techniques described herein are supportable by various configurations of the computing device 802 and are not limited to the specific examples of the techniques described herein. This functionality is also implementable entirely or partially through use of a distributed system, such as over a "cloud" 814 as described below.

The cloud 814 includes and/or is representative of a platform 816 for resources 818. The platform 816 abstracts underlying functionality of hardware (e.g., servers) and software resources of the cloud 814. For example, the resources 818 include applications and/or data that are utilized while computer processing is executed on servers that are remote from the computing device 802. In some examples, the resources 818 also include services provided over the Internet and/or through a subscriber network, such as a cellular or Wi-Fi network.

The platform 816 abstracts the resources 818 and functions to connect the computing device 802 with other computing devices. In some examples, the platform 816 also serves to abstract scaling of resources to provide a corresponding level of scale to encountered demand for the resources that are implemented via the platform. Accordingly, in an interconnected device embodiment, implementation of functionality described herein is distributable throughout the system 800. For example, the functionality is implementable in part on the computing device 802 as well as via the platform 816 that abstracts the functionality of the cloud 814.

CONCLUSION

Although implementations of systems for suggesting content components have been described in language specific to structural features and/or methods, it is to be understood that the appended claims are not necessarily limited to the specific features or methods described. Rather, the specific features and methods are disclosed as example implementations of systems for suggesting content components, and other equivalent features and methods are intended to be within the scope of the appended claims. Further, various different examples are described and it is to be appreciated that each described example is implementable independently or in connection with one or more other described examples.

What is claimed is:

1. In a digital medium environment for creating and editing digital content, a method implemented by a computing device, the method comprising:
   receiving, by a document object model (DOM) module, input data describing a feature of a content component to be included in a hypertext markup language (HTML) document;

representing, by the DOM module, the feature of the content component as a DOM element;

determining, by a hashing module, a hash value for the DOM element using locality-sensitive hashing;

computing, by a relevancy module, Manhattan distances between the hash value and hash values described by a segment of content component data, the hash values determined using the locality-sensitive hashing for DOM elements extracted from a corpus of HTML documents; and generating, by a display module for display in a user interface, indications of candidate content components for inclusion in the HTML document based on the Manhattan distances.

2. The method as described in claim 1, wherein the feature of the content component is at least one of style, context, or content.

3. The method as described in claim 1, wherein the locality-sensitive hashing is based on p-stable distributions and the segment of the content component data corresponds to a hash bucket for the locality-sensitive hashing.

4. The method as described in claim 1, wherein the indications of the candidate content components are generated as a list arranged in an ascending order of the Manhattan distances.

5. The method as described in claim 1, wherein the indications of the candidate content components are generated as a list arranged in a descending order of the Manhattan distances.

6. The method as described in claim 1, wherein the HTML document is an incomplete version of a template and the corpus of HTML documents includes completed versions of the template.

7. The method as described in claim 6, wherein the template is an e-mail template.

8. The method as described in claim 6, further comprising generating, automatically and without user intervention, additional completed versions of the template by including one of the candidate content components in each of the additional completed versions of the template.

9. In a digital medium environment for creating and editing digital content, a system comprising:

a document object model (DOM) module implemented at least partially in hardware of a computing device to:
  receive input data describing a feature of a content component to be included in a hypertext markup language (HTML) document; and
  represent the feature of the content component as a DOM element;

a hashing module implemented at least partially in the hardware of the computing device to determine a hash value for the DOM element using locality-sensitive hashing;

a relevancy module implemented at least partially in the hardware of the computing device to compute Manhattan distances between the hash value and hash values described by a segment of content component data, the hash values determined using the locality-sensitive hashing for DOM elements extracted from a corpus of HTML documents; and a display module implemented at least partially in the hardware of the computing to device to generate, for display in a user interface, indications of candidate content components for inclusion in the HTML document based on the Manhattan distances.

10. The system as described in claim 9, wherein the locality-sensitive hashing is based on p-stable distributions and the segment of the content component data corresponds to a hash bucket for the locality-sensitive hashing.

11. The system as described in claim 9, wherein the feature of the content component is at least one of style, context, or content.

12. The system as described in claim 9, wherein the HTML document is an incomplete version of a template and the corpus of HTML documents includes completed versions of the template.

13. The system as described in claim 12, wherein the candidate content components are extracted from the completed versions of the template.

14. The system as described in claim 12, wherein the template is an e-mail template.

15. The system as described in claim 12, wherein the display module is further implemented to generate, automatically and without user intervention, additional completed versions of the template by including one of the candidate content components in each of the additional completed versions of the template.

16. One or more computer-readable storage media comprising instructions stored thereon that, responsive to execution by a computing device, causes the computing device to perform operations including:

receiving input data describing a feature of a content component to be included in a hypertext markup language (HTML) document;

representing the feature of the content component as a document object model (DOM) element;

determining a hash value for the DOM element using locality-sensitive hashing;

accessing content component data that describes hash buckets and candidate content components assigned to the hash buckets using the locality-sensitive hashing, the candidate content components extracted from a corpus of HTML documents;

identifying a particular hash bucket from the content component data based on the hash value; and generating, for display in a user interface, indications of particular candidate content components that are included in the particular hash bucket for inclusion in the HTML document.

17. The one or more computer-readable storage media as described in claim 16, wherein the HTML document is an incomplete version of a template and the corpus of HTML documents includes a completed version of the template.

18. The one or more computer-readable storage media as described in claim 17, wherein the particular candidate content components are extracted from the completed version of the template.

19. The one or more computer-readable storage media as described in claim 16, wherein the feature of the content component is at least one of style, context, or content.

20. The one or more computer-readable storage media as described in claim 16, wherein the locality-sensitive hashing is based on p-stable distributions.

* * * * *